United States Patent [19]

Casner

[11] Patent Number: 4,517,411
[45] Date of Patent: May 14, 1985

[54] METHOD AND APPARATUS FOR PRIVATE BRANCH EXCHANGE BILLING

[75] Inventor: Kenneth H. Casner, 3004 Preston Ct., Rockwall, Tex. 75087

[73] Assignee: Kenneth H. Casner, Rockwall, Tex.

[21] Appl. No.: 389,855

[22] Filed: Jun. 18, 1982

[51] Int. Cl.³ .............................................. H04M 15/34
[52] U.S. Cl. ................................. 179/7 R; 179/7.1 TP
[58] Field of Search ............... 179/7.1 TP, 7.1 R, 7 R, 179/7 MM, 8 R, 6.17, 6.03, 5.5, 27 FB, 18 B

[56] References Cited

U.S. PATENT DOCUMENTS 4,332,982  1/1982  Thomas ........................ 179/7.1 TP Primary Examiner—Stafford D. Schreyer
Attorney, Agent, or Firm—Kenneth R. Glaser

[57] ABSTRACT

A method and apparatus for electronically verifying the originating station for calls made from one of a plurality of station lines of a private branch exchange. An electronic memory is utilized to store the telephone number input by a station user at one of said station lines. An audio message is generated which requests that the user enter the identifying number corresponding to that selected station. Automated dial equipment is utilized to access the station corresponding to the identifying number entered by the user and a verification signal is generated if the station corresponding to that identifying number is engaged. An appropriately programmed microprocessor is then utilized to transmit the telephone number stored in memory and to generate and store billing data associated with each station.

21 Claims, 2 Drawing Figures

METHOD AND APPARATUS FOR PRIVATE BRANCH EXCHANGE BILLING

BACKGROUND OF THE INVENTION

This invention relates in general to methods and apparatus used to bill for calls made through a private branch exchange and in particular to methods and apparatus for verifying the identity of the originating station.

Private branch exchanges, or PBX's, such as the types installed in hotels, factories and/or large offices have been known for some time in the prior art. Billing systems utilized to allocate the cost of such systems on a per station/per call basis have typically utilized an accounting service supplied by the serving utility telephone company (e.g. Hotel Billing Information Center "HOBIC" or "QZ" auto-quote) and electromechanical or electronic local call message registers which receive message charging pulses transmitted remotely from the local central office.

From the standpoint of reliability such systems do not perform satisfactorily. The "HOBIC" operator is told by the person placing the call which station he is utilizing. This information received is not verifiable and therefore subject to inconsistencies.

On Dec. 28, 1980, the Federal Communications Commission published Report and Order 80.54 which among other things allows for the resale of interstate long distance telephone service (MTS) by hotel owners to their guests. Guest calls may now be placed via Direct Distance Dialing (DDD) or Wide Area Telephone Service (WATS). The problem raised by this approach is one of accountability and exactly how to bill the cost of such phone calls on a per station basis without utilizing a local full time operator at the private branch exchange location or installing expensive monitoring equipment at each local station. While the cost of long distance phone calls may be routinely calculated by means of a number called, time of day and duration algorithm, the means of verifying the origination station from a plurality of local stations has remained a problem.

SUMMARY OF THE INVENTION

Therefore, it is one object of the present invention to provide an improved private branch exchange billing method and apparatus.

It is another object of the present invention to provide an improved private branch exchange billing method and apparatus which permits simple verification of the identification of the local station.

It is yet another object of the present invention to provide an improved private branch exchange billing method and apparatus which may be implemented utilizing standard telephone equipment.

It is another object of the present invention to provide an improved private branch exchange billing method and apparatus which may be easily and inexpensively retrofitted to existing private branch exchange systems.

The foregoing objects are achieved as is now described. An electronic memory is utilized to store the telephone number input by a station user at one of said station lines. An audio message is generated which requests that the user enter the identifying number corresponding to that selected station. Automated dial equipment is utilized to access the station corresponding to the identifying number entered by the user and a verification signal is generated if the station corresponding to that identifying number is engaged. An appropriately programmed microprocessor is then utilized to transmit the telephone number stored in memory and to generate and store billing data associated with each station.

BRIEF DESCRIPTION OF THE DRAWINGS

The novel features believed characteristic of the invention are set forth in the appended claims. The invention itself; however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
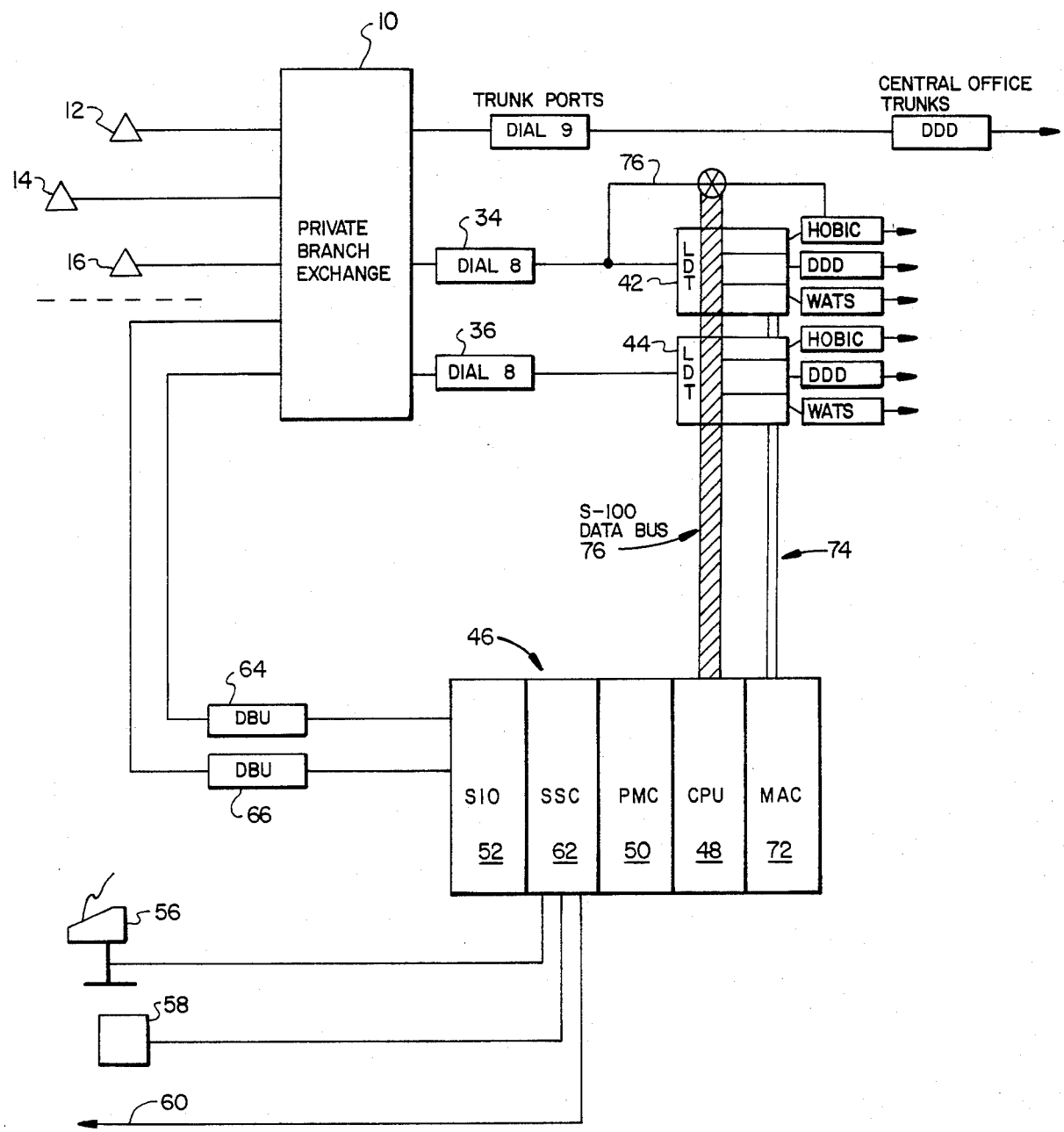
FIG. 1 is a block diagram of the improved private branch exchange billing apparatus of the present invention.

With reference now to the figures and in particular with reference to FIG. 1, there is depicted a block diagram of the improved private branch exchange billing apparatus of the present invention. The majority of the components of the apparatus depicted in FIG. 1 are standard off-the-shelf components or generally available state of the art microprocessor equipment and peripherals and it is anticipated that upon reference to the apparatus depicted herein, those ordinarily skilled in the art will find various alternate methods of accomplishing the method of the present invention with alternate types of equipment.

Referring now to FIG. 1, there is depicted a private branch exchange 10 with a plurality of stations 12, 14, and 16 coupled thereto and which illustrate the type of stations for which accountability of cost is desired.

Long distance billable calls are routed through the PBX from accountable stations to trunks 34 and 36 and into Long Distance Trunk (LDT) units 42 and 44. LDT units 42 and 44 are, in a preferred embodiment of the present invention, S-100 BUS 76 compatible sub-systems. Each LDT unit includes provision for causing an input telephone number to be temporarily stored until such time as an output routing and/or billing decision has been made.

The operations of LDT units 42 and 44 are supervised by control system 46 which consists of five separate sub-systems. The heart of control system 46 is Central Processing Unit (CPU) 48 which serves to direct the operation of the novel apparatus of the present invention. CPU 48 is implemented utilizing a microprocessor which is programmed using any high-level operating system suited to telemanagement functions.

Necessary instructions and relevant data tables are stored in Program Memory Card (PMC) 50 which may consist of any combination of volatile random access memory and non-volatile, read only memory. Again, in a preferred embodiment of the present invention, volatile memory may be protected from erasure during power fluctuations utilizing any battery backup system known in the art.

Serial Input/Output (SIO) card 52 consists of five input/output ports which may accommodate needed peripheral equipment such as printer 56, alarm unit 58 or an output line 60 which may be coupled to a remote terminal or Business Management (accounting) System. Serial Input/Output (SIO) card 52 may utilize well known input/output equipment such as a standard ASCII RS-232 110-9600 baud, KSR terminal to accomplish the serial data transfer required in the functions of peripheral equipment.

System Support Card (SSC) 62 includes the real time clock/calendar, interval timers and tables which are necessary to permit calculation of costs for various long distance calls in accordance with published tariff rates.

The final sub-system of control system 46 is Miscellaneous Accommodations Card (MAC) 72. MAC 72 includes a message generating circuit and audio switching circuits and is coupled to LDT units 42 and 44 through audio lines 74 which permit an audio message to be coupled to the operator at an accountable station coupled to either LDT 42 or 44.

Further, MAC 72 controls the functions of Dial Back Units (DBU) 64 and 66. Dial Back Units 64 and 66 are coupled to private branch exchange 10 and are utilized to verify the busy/non-busy condition of an accountable station in the manner to be explained herein.

Each LDT unit depicted has three possible outputs which may be utilized as optional routes for each outgoing telephone call. In the event of a system failure, an outgoing telephone call is routed around the LDT units through circuit 76 to the HOBIC operator in the manner of known systems discussed above. Additionally, each LDT unit may, upon verification of station busy condition, route a long distance call to the Direct Distance Dialing (DDD) trunk. Finally, the system of the present invention permits an outgoing phone call to be routed to a lower cost system such as the Wide Area Telephone System (WATS) or a commercially available direct connect and dial-up competing common carrier system such as MCI or ITT.

Figure 2:
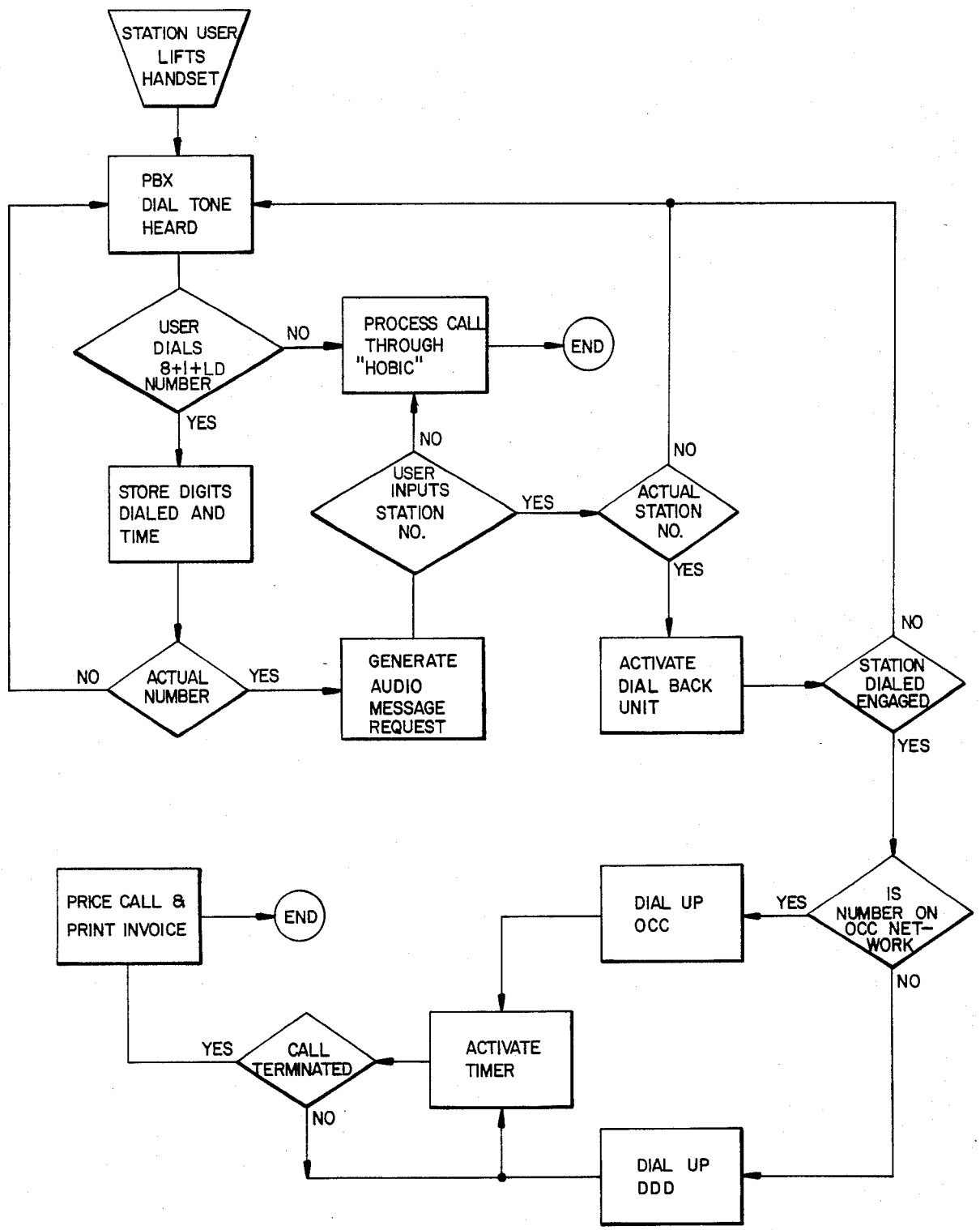
FIG. 2 is a logical flow diagram illustrating the improved private branch exchange billing method of the present invention.

Referring now to the logic flow diagram depicted in FIG. 2 and the block diagram of FIG. 1, the operation of the apparatus of the present invention and the method disclosed herein will be explained. As may be seen in the logic flow diagram, the process is initiated by a station user lifting the handset of a remote station and receiving the dial tone generated by the PABX. Following receipt of the dial tone the station user will dial the long distance trunk access code (usually "8" in a hotel) plus "1" for direct dial or "0" for operator assist (reverse charge, credit card, person-to-person, collect, etc.) and the telephone number.

If the station user correctly accesses the LD trunk the phone number input by the station user and the time of day are stored in random access memory. Next, the digits entered by the station user are examined to determine whether these digits constitute an actual phone number. If the digits dialed do not constitute an actual phone number the station user will once again receive a PBX dial tone. In the event that the digits entered do constitute an actual phone number, the message generating circuit associated with MAC card 72 will cause an audio message to be generated via an audio pair 74 connecting to the LD trunk asking the station user to input the appropriate station number or room number which identifies the station which he or she is utilizing.

If the station user has failed to input a station number the call will again be processed through the HOBIC operator. If the station user has input a station number, the novel system of the present invention will first compare the input station number with a list of valid station numbers stored in Program Memory Card 50 to determine whether or not the input station number is indeed valid. If the station number entered is valid, a Dial Back Unit (DBU) is activated and the station number entered is dialed utilizing a dedicated station line of the local private branch exchange. If the station number dialed by the Dial Back Unit (DBU) generates a busy signal, indicating the station is engaged, the system will generate a verification message to the CPU. The verification message serves to indicate that the station number input by the operator is indeed the origination station for the phone call. If the station number dialed by the Dial Back Unit (DBU) is not engaged, the system will interpret this to mean that the accountable station for the phone call being processed has not been verified and the call will be processed over HOBIC facilities as a default condition.

Once the verification has been received the system may analyze the number dialed to determine whether or not a low cost alternative routing is available or may simply place the telephone call via the utility DDD network. In either event, a timer is activated which will determine the elapsed time of the telephone call and which will with other information be utilized to generate a cost figure for that call in accordance with a selected price algorithm.

In the manner illustrated herein, those ordinarily skilled in the art will appreciate that this fully automated system will verify the identity of an individual station coupled to a private branch exchange for the purpose of cost accountability by causing the station user to input an identifying station number and attempting to access that station. Utilizing standard telephone dial equipment, it is possible through the practice of the present invention to generate per station cost accountability data for a private branch exchange without modifying the present system of the private branch exchange and without requiring the services of a full time operator at the physical location of the private branch exchange.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. Apparatus for utilization with a private branch exchange having a plurality of telephone stations and central office trunks for verifying the particular call originating station of said plurality of telephone stations, said apparatus comprising:

first memory means for receiving and storing a telephone number entered by a station user at a selected one of a plurality of telephone stations;

first means responsive to the reception and storage of said telephone number for requesting that said station user enter a particular station number corresponding to said selected one of said plurality of telephone stations;

verification means responsive to the entry of said particular station number for verifying the utilization of said selected one of said plurality of telephone stations; and control means for accessing said first memory means in response to said verification and for transmitting said telephone number to one of said plurality of central office trunks.

2. The apparatus according to claim 1 wherein said first means comprises remote means for generating and applying a voice announcement requesting that said station user enter a particular station number corresponding to said selected one of said plurality of telephone stations.

3. The apparatus according to claim 1 wherein said verification means comprises means for selectively accessing one of said plurality of telephone stations utilizing said particular station number and means for generating a verification signal in response to a signal indicating said one of said plurality of telephone stations is engaged.

4. The apparatus according to claim 1 wherein said control means comprises a microprocessor.

5. The apparatus according to claim 4 further including second memory means for storing billing data corresponding to each of said plurality of telephone stations.

6. The apparatus according to claim 5 further including timing means for timing the duration of each call originated by each of said plurality of telephone stations.

7. The apparatus according to claim 5 further including printer means for providing printed copies of said billing data.

8. A method of verifying the originating telephone station from a plurality of telephone stations coupled to a private branch exchange having a plurality of central office trunks, said method comprising the steps of:
   storing the telephone number entered by a station user at a selected one of said plurality of telephone stations;
   causing said station user to enter a particular station number corresponding to said selected one of said plurality of telephone stations;
   accessing one of said plurality of telephone stations utilizing said particular station number;
   generating a verification signal in response to a signal indicating said one of said plurality of telephone stations is engaged; and
   accessing said stored telephone number in response to said verification message and transmitting said telephone number to one of said plurality of central office trunks.

9. The method according to claim 8 further including the step of timing the duration of each phone call originated by each of said plurality of telephone stations.

10. The method of claim 9 further including the step of storing billing data associated with each of said plurality of telephone stations.

11. In a communication network of the type having operating means for establishing communication between at least one calling station and at least one called station, apparatus for controlling access of said calling and called stations with one another, said apparatus comprising:
   first means for receiving and storing data representative of said at least one called station entered by a station user at said at least one calling station;
   second means responsive to the reception and storage of said data for requesting that said station user enter an identification of said at least one calling station;
   third means responsive to the entry of the said identification of said at least one calling station for verifying the engagement of said at least one calling station; and
   fourth means for accessing said first means in response to verification of engagement of said at least one calling station, and for transmitting said data of said at least one called station to said operating means.

12. The apparatus according to claim 11, wherein said third means comprises means for selectively accessing said at least one calling station associated with said identification of said at least one calling station and means for generating a verification signal in response to engagement of said at least one calling station.

13. The apparatus according to claim 11, further including fifth means for determining whether said data representative of said at least one called station is proper.

14. The apparatus according to claim 11, wherein said second means comprises audio means for generating an audio signal requesting that said station user enter said identification of said at least one calling station.

15. The apparatus according to claim 11, further comprising sixth means for determining a duration of time that said at least one calling station is in communication with said at least one called station.

16. The apparatus according to claim 15, further comprising seventh means for generating and storing billing data associated with said at least one calling station.

17. The apparatus as set forth in claim 16, further comprising eighth means for providing visual display of said billing data.

18. In a communication network of the type having operating means for establishing communication between at least one calling station and at least one called station, a method for controlling access of said calling or called stations with one another, said method comprising the steps of:
   storing data representative of said at least one called station entered by a station user at said at least one calling station;
   requesting said station user to identify said at least one calling station;
   verifying the engagement of said at least one calling station; and
   transmitting said data representative of said at least one called station to said operating means.

19. The method according to claim 18, further including the step of verifying said identification of said at least one calling station to determine whether said identification is proper.

20. The method according to claim 19, further comprising the steps of generating and storing billing data associated with said at least one calling station.

21. The method according to claim 20, further comprising the step of visually displaying said billing data.

* * * * *